Aug. 30, 1966   M. S. ISAACSON   3,270,220

MINIATURE D.C. MOTOR

Original Filed Jan. 12, 1959   4 Sheets-Sheet 1

INVENTOR.
MILTON S ISAACSON
BY *Milton E. Gilbert*
HIS ATTORNEY

Aug. 30, 1966  M. S. ISAACSON  3,270,220
MINIATURE D.C. MOTOR

Original Filed Jan. 12, 1959  4 Sheets-Sheet 2

INVENTOR.
MILTON S. ISAACSON
BY *Milton E. Gilbert*
HIS ATTORNEY

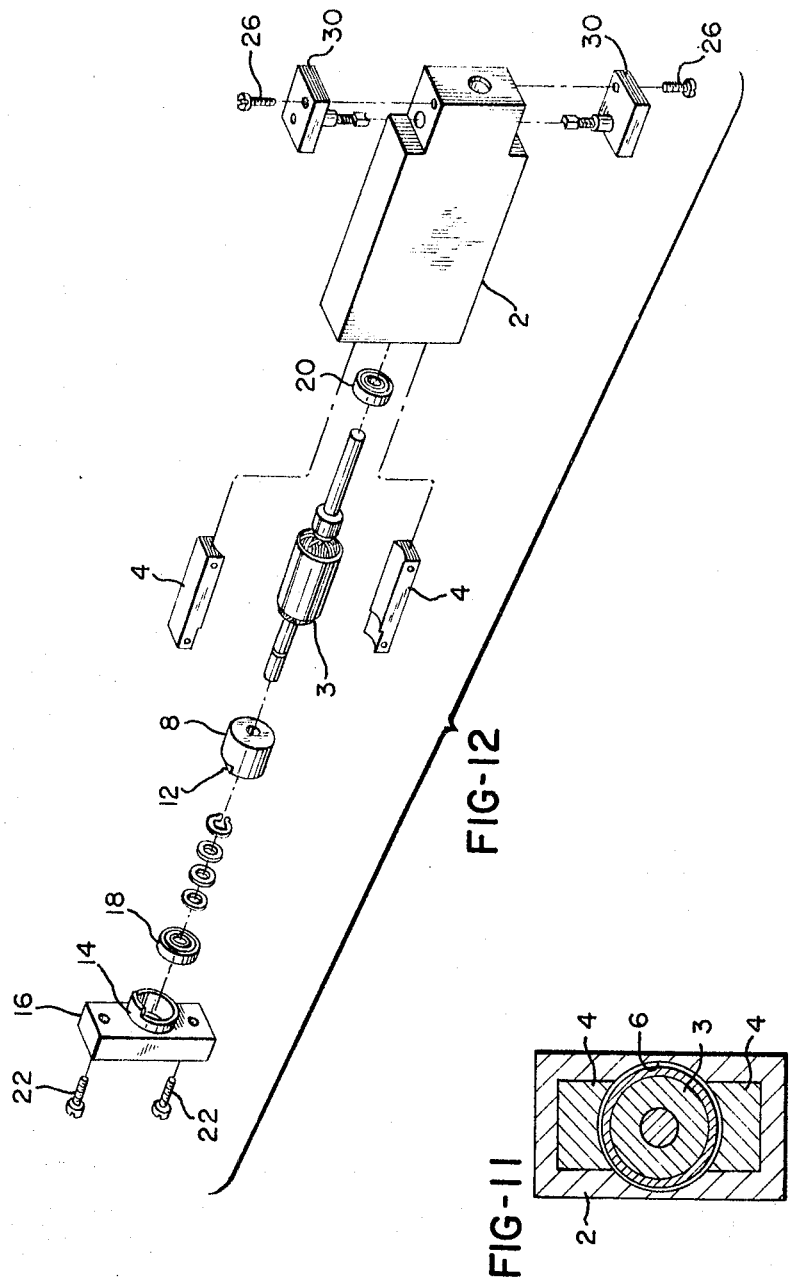

United States Patent Office 3,270,220
Patented August 30, 1966

3,270,220
MINIATURE D.C. MOTOR
Milton S. Isaacson, Trotwood, Ohio, assignor to Globe Industries, Inc., Dayton, Ohio, a corporation of Ohio
Continuation of application Ser. No. 786,326, Jan. 12, 1959. This application Nov. 30, 1964, Ser. No. 416,957
5 Claims. (Cl. 310—40)

This invention relates to a novel construction for a miniature D.C. motor and method for its manufacture.

This application is a continuation of my prior application Serial Number 786,326, filed on January 12, 1959, now abandoned.

It is one object of this invention to provide a motor which is of extremely small dimensions and which can be simply and readily assembled. A further object of the invention is to provide a small, flat motor having no protuberances which can be assembled into various packaged units. A still further object of the invention is to provide a small, flat motor which can be readily manufactured and which will have operating characteristics at a maximum for its size. Another object is to provide a novel method for manufacturing a miniature motor.

These and other advantages will become more readily apparent upon a reading of the description following hereinafter, and upon an examination of the accompanying drawings, in which:

FIGURE 11 is a cross-sectional view taken along line 11—11 of FIGURE 1; and

FIGURE 12 is an exploded perspective view of the embodiment of the invention shown in FIGURE 1.

Figure 1:
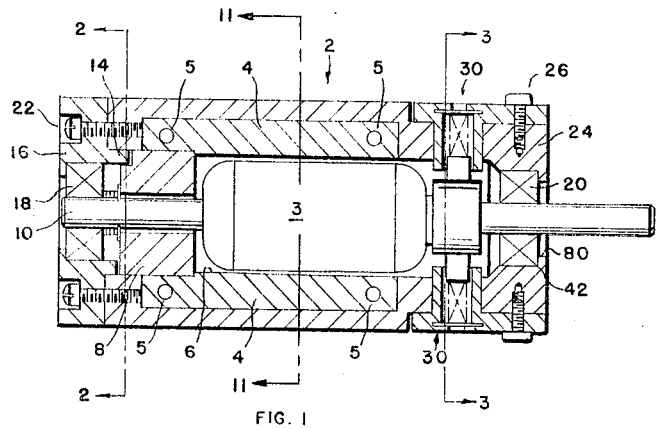
FIGURE 1 is a cross-sectional view of one embodiment of the invention.
Figure 2:
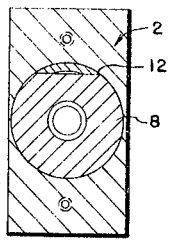
FIGURE 2 is a cross-sectional view taken along line 2—2 of FIGURE 1.

The motor of the invention is exceedingly small and as an indication of its size, one embodiment has outside dimensions of .4375" high by .875" wide and 1.875" long. In the embodiment of FIGURE 1, the motor comprises a stator casing generally designated 2 and a rotor generally designated 3. The stator 2 may be formed of a single piece of non-magnetic material such as aluminum, which has embedded within it the pole pieces 4, 4. The pole pieces are provided with a series of locating holes 5 which are the means by which all the drilling, boring, reaming, etc., operations are located and performed during the manufacture of the motor. Centrally located within the pole piece 4, 4 is a chamber 6 to accommodate the motor 3 (see FIGURES 1 and 11). A permanent magnet 8 is freely but closely mounted within the chamber 6, but spaced from the rotor shaft 10. The magnet 8 is of cylindrical form and has a recessed step 12, which cooperates with a lug extension 14 (see FIGURE 12) protruding from the end cap 16 to prevent rotational movement of the magnet 8. Also, the chamber portion around the magnet is so proportioned (e.g., .004" greater in diameter than the portion of the bore beyond the magnet—see left-hand portion of FIGURE 1) that the magnet is prevented from moving inwardly. Thus, the permanent magnet 8 surrounds the rotor shaft 10 so that the rotor shaft 10 forms a portion of the magnetic circuit which includes the armature 3, pole pieces 4 and magnet 8. The holes 5 are so placed that they do not lie in the path of maximum flux flow in the circuit just described. In other words, the holes 5 on the left side of the motor, as viewed in FIGURE 1, are not placed in line with the right end of the magnet 8, where they would lie at the point of greatest pole flux concentration so that they would impede the flow of flux.

The rotor shaft 10 is journaled in bearings 18 and 20, the bearing 18 being held in place by the end cap 16 on one side, and appropriate snap rings and shims on the other side. The cap is appropriately fastened, as by the screws 22 to the stator 2. The bearing 20 is held in place by the portion 24 of the stator housing 2 on one side, and the armature and shims on the other side. The stator 2 is of generally parallelepipedous configuration and comprises an open end which is closed by the end cap 16 and a "closed" end, at which "closed" end a pair of brushes 30, 30 are mounted.

Figure 3:
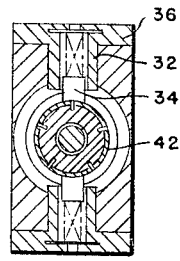
FIGURE 3 is a cross-sectional view taken along line 3—3 of FIGURE 1.
Figure 7:
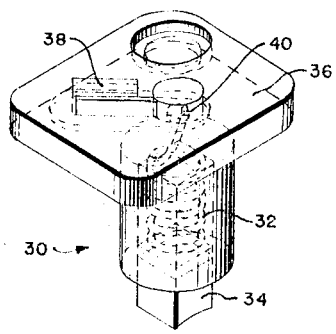
FIGURE 7 is a perspective view of the brush assembly of the invention.

In order to provide the extreme thinness of the motor, the brushes are placed in line with the pole pieces and parallel thereto. These brushes may advantageously be made in the manner shown in FIGURE 7, wherein the brush assembly 30 consists of a brush 34 of carbon or other conductive material which has soldered thereto a spring 32 which acts as a conductor. The other end of the spring projects through an opening 40 in a brush holder 36, upon which is mounted the terminal 38. The hole 40 extends through this terminal 38, so that the end of the spring 32 is extended through the brush holder 36 and through the terminal 38 and soldered thereto. The brushes 34 operate with a conventional commutator 42 as shown in FIGURE 3.

Figure 5:
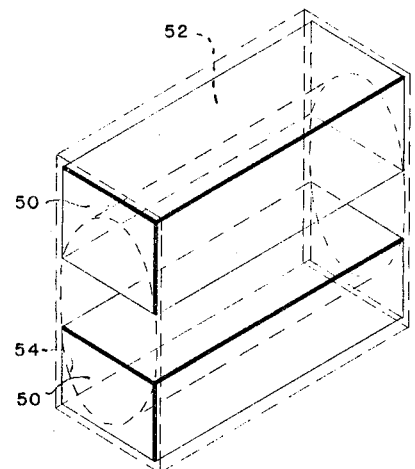
FIGURE 5 is a perspective view of a portion of the motor of the invention illustrating one method of forming the pole pieces.
Figure 6:
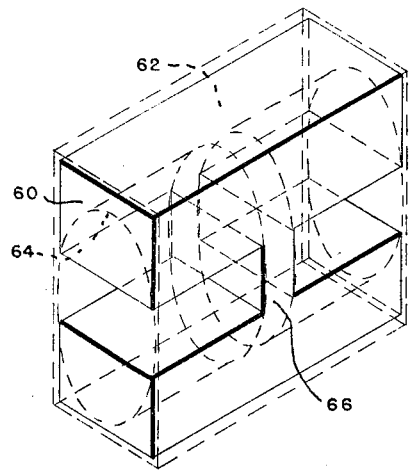
FIGURE 6 is a perspective view similar to FIGURE 5, but illustrating still another method of forming the motor of the invention.

In the manufacture of the motor of FIGURE 1, several forms of pole pieces can be employed. As shown in FIGURE 5, a pair of identical bars of magnetic material 50, 50 can be employed which are fastened into or cast into a stator housing 52 (shown in dotted lines) which is closed at one end. Thereafter, a bore 54 (shown in dotted lines) can be drilled through this pole piece-stator assembly. In another form of the invention an H-shaped pre-stamped pole piece 60 can be employed, which would also be embedded into a stator housing 62 (shown in dotted lines) closed at one end, and thereafter a bore 64 (shown in dotted lines) would be drilled through this pole piece 60, removing the central portion 66.

Figure 8:
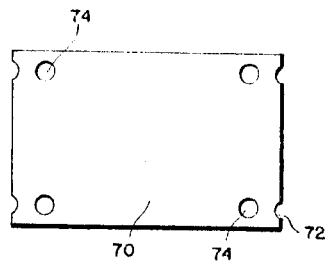
FIGURE 8 is a frontal view of a pole piece as employed in the motor of FIGURE 1.
Figure 9:
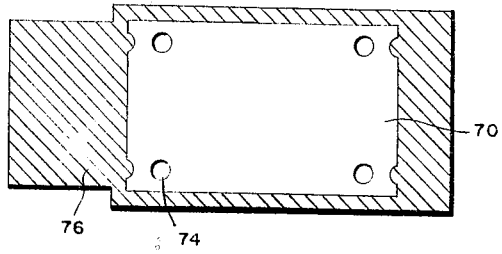
FIGURE 9 is a cross-sectional view of a housing and pole piece employed in the method of the invention.

The preferred manner of manufacturing the motor of the invention employs first a substantially rectangular piece of flat bar-stock 70, which would be stamped or otherwise formed from ferromagnetic material. The pole piece may also be made from powdered metal to the same configuration. This piece 70 can be provided with a series of notches 72, for a purpose that is more fully explained hereinafter. The bar-stock 70 would have a series of holes 74 drilled therein, which are used as the locating means for performing all the remaining operations during the assembly and manufacture of the unit. After this blank 70 is severed from bar-stock and the locating holes are drilled, the blank may then be metal plated; the metal plating may consist of copper zinc, cadmium or any other suitable plating which would form a bond uniting the ferromagnetic material to the non-ferrous material of the stator housing. The blank may be notched at 72, as shown in FIGURE 8, in order to form a more secure bond with the housing. The thus completed blank, as shown in FIGURE 8, is then placed in an appropriate mold and a stator housing is cast completely therearound, as shown in FIGURE 9. This stator housing 76 will thereafter be used to form the stator frame 2. During the diecasting of this housing, the holes 74 are used to accommodate locating pins of the die so that they do not become filled with the cast material. In every succeeding operation, these holes 74 are used from which to locate for the various machining operations.

Referring to FIGURE 1, the chamber 6 would be formed centrally of this cast assembly by drilling from the left side, as viewed in FIGURE 1, opening a small opening through the housing 2 at 80, to permit the rotor shaft 10 to extend therethrough. The seat for the bearing 20 and the chamber 6 may then be formed by boring in a similar manner, locating from the locating holes 5, 5 (see FIGURE 1).

Figure 4:
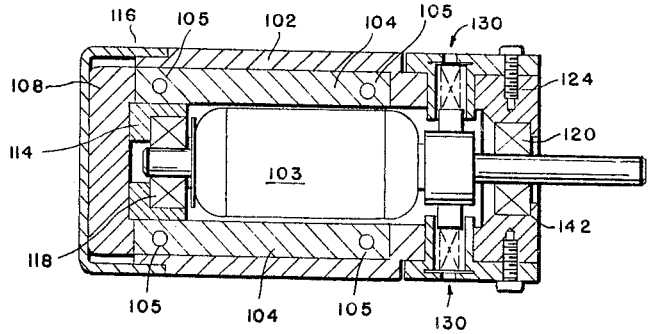
FIGURE 4 is a cross-sectional view through another embodiment of the motor of the invention similar to FIGURE 1.

FIGURE 4 shows an alternate construction of the motor of the invention wherein a somewhat horseshoe-shaped magnet 108 is employed, instead of the cylindrical magnet 8. In this instance the magnet 108 is held onto the pole pieces 104 by a cap 116, which is suitably fastened to the stator 102. The pole pieces 104 extend further towards the left, as viewed in FIGURE 4. The rotor 103 is journaled in bearings 118 and 120, the bearing 118 being retained in position by a spacer member 114, and the bearing 120 being retained in position by the portion 124 of the stator 102. Brushes 130 are provided for engaging the commutator 142 in a manner similar to that shown in FIGURE 1.

Figure 10:
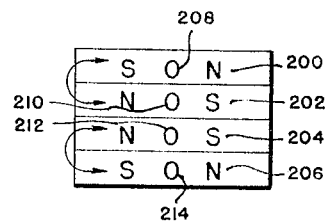
FIGURE 10 is a frontal view of several motors of the invention, indicating how they can be arranged in an application requiring a plurality of motors arranged one on top of the other.

Miniature motors of the invention are employed in various applications, and in one such application a plurality of them may be mounted one on top of another to drive a series of counters. In such an application it has been found that due to the thinness of the motors and the close arrangement of their magnetic fields, one motor may tend to demagnetize the motor adjacent to it in such a package arrangement. FIGURE 10 illustrates a method of arranging the motors of the invention in such a stacked relationship. The motors may be bolted together by means of the four mounting holes 5, 5 as shown in FIGURE 1. These motors 200, 202, 204 and 206 can be assembled together to some other piece of apparatus. As illustrated in FIGURE 10, the output shafts 208, 210, 212 and 214 of these motors all extend in the same direction, and the units are so arranged that the north and south poles bear the relationship as shown in FIGURE 10. With such an arrangement the speeds of the several motors are approximately the same, since the leakage between them is about the same. Were the motors to be assembled with the relationship that the poles would alternate between north and south in the stacked relationship shown in FIGURE 10, then undue leakage would occur between the two inside motors 202 and 204, and the two inside motors 202 and 204 would run slightly faster than the two outside motors 200 and 206. However, when the motors are stacked as viewed in FIGURE 10, then leakage would occur only between the motors 200 and 202, and 204 and 206, with substantially little leakage occurring between motors 202 and 204, so that the motors would tend to run substantially at the same speed.

There is thus disclosed a thin D.C. permanent magnet motor of miniature size, but of powerful performance. In the motor of the invention, the motor brushes lie in the plane of the pole pieces or are parallel to them and the brush guides are located adjacent the closed end of the unit. Although what has been disclosed are preferred embodiments of the invention, it is to be understood that various changes and modifications may be made in particular features and methods of construction while still falling within the scope of the invention.

What I claim is:
1. A motor comprising a stator and an armature; said stator comprising a casting consisting of opposed pole pieces encapsulated by non-magnetic material extending on all surfaces thereof except a bore therethrough, said bore consisting of a series of three passages coaxially arranged in progressively decreasing diameter to provide openings for receiving a magnet, an armature and a bearing, respectively, and a cap member mounted to said stator to close said series of passages and to provide bearing means coaxial with said stator, said stator as viewed in transverse cross-section having a long and a short dimension, said pole pieces extending in the direction of said long dimension and said short dimension being only slightly larger than said armature.

2. The motor of claim 1 wherein said stator includes a pair of brush means adapted to cooperate with a commutator on said armature, the axis of said brushes lying in the plane containing the polar axis of said pole pieces with said axes being parallel to one another, the axis of said brushes extending in the direction of the long dimension of said transverse cross-section.

3. The motor of claim 1 including a pluraliy of locating holes extending through said housing and pole pieces, from which all of the subsequent machining operations may be located, said holes having been formed simultaneously with the formation of said non-magnetic material around said pole pieces.

4. A thin flat motor comprising a housing of generally parallelepipedous configuration being formed of non-magnetic material bonded in situ to and completely surrounding pole pieces of magnetizable material, said housing being open at one end and substantially closed at its other end and provided with a longitudinally extending chamber centrally therein leading to said open end, a rotor in said chamber between said pole pieces, said rotor being provided with a commutator disposed towards the substantially closed end of said housing, a bearing support at the open end of said housing, a substantially cylindrical permanent magnet floatingly mounted about the shaft of said rotor between the magnetic core thereof and said bearing support, and a pair of brushes disposed in brush guides within said housing in contact with said commutator, the axis of said brushes lying in the plane containing the polar axis of said pole pieces with said axes being parallel to one another, whereby there is obtained an extremely thin motor of maximum performance for its dimensions, which is adapted for stacking with similar motors arranged parallel to the said plane containing the polar axis.

5. A thin flat motor comprising a housing of generally parallelepipedous configuration having, as viewed in transverse cross-section, a long and a short dimension; said housing being formed of non-magnetic material bonded insitu to pole pieces of magnetizable material, said non-magnetic material surrounding said pole pieces and extending on all surfaces thereof except a bore therethrough, said housing being open at one end and substantially closed at its other end and provided with a longitudinally extending chamber centrally therein leading to said open end; a rotor in said chamber between said pole pieces; said rotor being provided with a commutator disposed towards the substantially closed end of said housing; a bearing support at the open end of said housing; a permanent magnet disposed within said housing in juxtaposition to said pole pieces; and a pair of brushes disposed in brush guides within said housing in contact with said commutator; said brushes lying on a common brush axis; the axis of said brushes lying in the plane containing the polar axis of said pole pieces with said axes being parallel to one another, the axis of said brushes extending in the direction of the long dimension of said transverse cross-section, whereby there is obtained an extremely thin motor of maximum performance for its dimensions.

References Cited by the Examiner

UNITED STATES PATENTS

| | | | |
|---|---|---|---|
| 1,822,859 | 9/1931 | Perkins | 310—40 |
| 2,119,986 | 6/1938 | Dremel. | |
| 2,177,472 | 10/1939 | Barrett | 310—154 |
| 2,325,915 | 9/1943 | Naul | 310—154 |
| 2,465,446 | 3/1949 | Gorfin | 310—46 |
| 2,943,313 | 6/1960 | Gordon | 310—49 |
| 2,978,598 | 4/1961 | Kato | 310—154 |
| 2,999,952 | 9/1961 | Hammes | 310—46 |
| 3,002,261 | 10/1961 | Avila | 310—43 |

OTHER REFERENCES

Japanese application 33/2,514, Apr. 11, 1958.

MILTON O. HIRSHFIELD, *Primary Examiner.*

G. W. GIBBS, *Assistant Examiner.*